(12) United States Patent
Fukumoto et al.

(10) Patent No.: US 10,661,353 B2
(45) Date of Patent: May 26, 2020

(54) METHOD FOR PRODUCING HIGH-SPEED TOOL STEEL MATERIAL, METHOD FOR PRODUCING HIGH-SPEED TOOL STEEL PRODUCT, AND HIGH-SPEED TOOL STEEL PRODUCT

(71) Applicant: HITACHI METALS, LTD., Tokyo (JP)

(72) Inventors: Shiho Fukumoto, Yasugi (JP); Taishiroh Fukumaru, Tokyo (JP)

(73) Assignee: HITACHI METALS, LTD., Tokyo (JP)

( * ) Notice: Subject to any disclaimer, the term of this patent is extended or adjusted under 35 U.S.C. 154(b) by 9 days.

(21) Appl. No.: 15/579,626

(22) PCT Filed: Jun. 21, 2016

(86) PCT No.: PCT/JP2016/068374
§ 371 (c)(1),
(2) Date: Dec. 5, 2017

(87) PCT Pub. No.: WO2016/208571
PCT Pub. Date: Dec. 29, 2016

(65) Prior Publication Data
US 2018/0147636 A1 May 31, 2018

(30) Foreign Application Priority Data
Jun. 22, 2015 (JP) .................................. 2015-124584

(51) Int. Cl.
*C21D 9/22* (2006.01)
*B23B 27/14* (2006.01)
(Continued)

(52) U.S. Cl.
CPC ............ *B23B 27/148* (2013.01); *B23B 27/14* (2013.01); *B23B 51/00* (2013.01); *B23C 5/16* (2013.01);
(Continued)

(58) Field of Classification Search
CPC ....... B23B 27/14; B23B 27/148; B23B 51/00; B23C 5/16; C21D 1/18; C21D 1/26;
(Continued)

(56) References Cited

U.S. PATENT DOCUMENTS 4,036,670 A * 7/1977 De Walt .................... C21D 1/68
148/625
2004/0187972 A1 9/2004 Ozaki
(Continued)

FOREIGN PATENT DOCUMENTS

CN 102747293 A 10/2012
CN 103469084 A 12/2013
(Continued)

OTHER PUBLICATIONS

NPL: On-line English translation of CN 102747293A, Oct. 2012 (Year: 2012).*
(Continued)

*Primary Examiner* — Jie Yang
(74) *Attorney, Agent, or Firm* — Sughrue Mion, PLLC

(57) ABSTRACT

Provided are: a method for producing a high-speed tool steel material capable of increasing carbides in the structure of a high-speed tool steel product; a method for producing a high-speed tool steel product; and a high-speed tool steel product. The method for producing a high-speed tool steel material is provided with: a casting step for casting molten steel to obtain a steel ingot; a blooming step for heating the steel ingot obtained in said casting step to a temperature higher than 1120° C. and thereafter hot-working same to
(Continued)

obtain an intermediate material; and a finishing step for heating the intermediate material obtained in the blooming step to a temperature of 900-1120° C. and thereafter hot-working same to obtain the high-speed tool steel material. Further, said method for producing a high-speed tool steel material is provided with an annealing step for annealing the high-speed tool steel material obtained in said finishing step. The present invention is also: a method for producing a high-speed tool steel product, wherein quenching and annealing is performed on the high-speed tool steel material obtained in the production method above; and a high-speed tool steel product.

8 Claims, 2 Drawing Sheets

(51) Int. Cl.

| | |
|---|---|
| B23C 5/16 | (2006.01) |
| C22C 38/00 | (2006.01) |
| B23B 51/00 | (2006.01) |
| C22C 38/36 | (2006.01) |
| C21D 9/24 | (2006.01) |
| C21D 8/00 | (2006.01) |
| C21D 8/06 | (2006.01) |
| C21D 1/18 | (2006.01) |
| C21D 1/26 | (2006.01) |
| C21D 6/00 | (2006.01) |
| C21D 6/02 | (2006.01) |
| C22C 38/02 | (2006.01) |
| C22C 38/04 | (2006.01) |
| C22C 38/06 | (2006.01) |
| C22C 38/22 | (2006.01) |
| C22C 38/24 | (2006.01) |
| C22C 38/30 | (2006.01) |

(52) U.S. Cl.
CPC ............... *C21D 1/18* (2013.01); *C21D 1/26* (2013.01); *C21D 6/002* (2013.01); *C21D 6/005* (2013.01); *C21D 6/008* (2013.01); *C21D 6/02* (2013.01); *C21D 8/00* (2013.01); *C21D 8/06* (2013.01); *C21D 8/065* (2013.01); *C21D 9/22* (2013.01); *C21D 9/24* (2013.01); *C22C 38/00* (2013.01); *C22C 38/001* (2013.01); *C22C 38/002* (2013.01); *C22C 38/02* (2013.01); *C22C 38/04* (2013.01); *C22C 38/06* (2013.01); *C22C 38/22* (2013.01); *C22C 38/24* (2013.01); *C22C 38/30* (2013.01); *C22C 38/36* (2013.01); *C21D 2211/001* (2013.01)

(58) Field of Classification Search
CPC ...... C21D 2211/001; C21D 6/02; C21D 8/00; C21D 8/065; C21D 9/22; C22C 38/00; C22C 38/22
USPC .......................................................... 148/546
See application file for complete search history.

(56) References Cited

U.S. PATENT DOCUMENTS

| | | | |
|---|---|---|---|
| 2014/0079585 | A1 | 3/2014 | Fukumoto |
| 2018/0363080 | A1* | 12/2018 | Fukumoto ............... C22C 38/22 |

FOREIGN PATENT DOCUMENTS

| | | | |
|---|---|---|---|
| CN | 105522085 A | | 4/2016 |
| CN | 103469084 B | * | 12/2016 |
| EP | 1 087 030 A2 | | 3/2001 |
| EP | 2 865 775 A1 | | 4/2015 |
| JP | 02-232341 A | | 9/1990 |
| JP | 03-111515 A | | 5/1991 |
| JP | 04-111962 A | | 4/1992 |
| JP | 04-180540 A | | 6/1992 |
| JP | 9-3604 A | | 1/1997 |
| JP | 11-006042 A | | 1/1999 |
| JP | 2013-213277 A | | 10/2013 |
| JP | 2014-208870 A | | 11/2014 |

OTHER PUBLICATIONS

NPL: On-line English translation of CN 103469084B Dec. 2013 (Year: 3013).*
Communication dated Jul. 31, 2018 from the Japanese Patent Office in counterpart Japanese application No. 2017-524917.
International Search Report of PCT/JP2016/068374 dated Aug. 9, 2016.
Communication dated Jan. 7, 2019 from European Patent Office in counterpart EP Application No. 16814341.0.

* cited by examiner

METHOD FOR PRODUCING HIGH-SPEED TOOL STEEL MATERIAL, METHOD FOR PRODUCING HIGH-SPEED TOOL STEEL PRODUCT, AND HIGH-SPEED TOOL STEEL PRODUCT

CROSS REFERENCE TO RELATED APPLICATIONS

This application is a National Stage of International Application No. PCT/JP2016/068374 filed Jun. 21, 2016 (claiming priority based on Japanese Patent Application No. 2015-124584, filed Jun. 22, 2015), the contents of which are incorporated herein by reference in their entirety.

TECHNICAL FIELD

The invention relates to a method for producing a high-speed tool steel material used for a high-speed tool steel product such as a cutting tool, a cut-off tool or a mold. The invention also relates to a method for producing the high-speed tool steel product and also to the high speed tool steel product.

BACKGROUND ART

Since a high-speed tool steel has an excellent wear resistance, the material has been used as a material for a cutting tool, such as end mill, drill, tap or milling cutter, and a cutoff tool such as band saw. Also, the high speed tool steel material is used for a material of some plastic-working molds, such as for press or forging (see Patent Literatures 1-3).

Typically, the high speed tool steel material is produced as follows: a steel ingot is cast from a molten steel having adjusted to have a predetermined composition (a casting step) and then the ingot as a starting material is subjected to various hot workings and heat treatments to produce a steel material having a predetermined dimension. In the above hot workings, the ingot is first hot-worked and bloomed into intermediate materials in a form of a slab, a bloom, a billet, a sheet bar etc. (blooming step). Then, the intermediate material is further hot-worked to finish it in a steel material having a shape corresponding to a product (finishing step). When the product produced from the steel material is end mill, drill, tap etc., the steel material is made to have a rod shape having a diameter or a side of its cross-section being about 5-50 mm for example. When the product is band saw etc., the steel material is made to have a wire shape having a diameter or a side of its cross-section being about 1-5 mm for example.

The high speed tool steel material is typically provided to a manufacturer of the product, such as cutting tool, in an annealed state having low hardness. The material provided to the manufacturer is machined in a shape of the product, and then is adjust to have predetermined use hardness through quenching and tempering. Usually, the material having been adjusted to have the use hardness is subjected to finishing machining. In a case of a band saw, the wire-shaped material is welded to a base material, and then is subjected to machining (sharpening process) and quenching and tempering.

CITATION LIST

Patent Literature

Patent Literature 1: JP-A-2013-213277
Patent Literature 2: JP-A-11-006042
Patent Literature 3: JP-A-04-111962

SUMMARY OF INVENTION

A high-speed tool steel product has an excellent wear resistance, to which existence of carbides formed in its structure significantly contributes. In this respect, the high speed tool steel products according to Patent Literatures 1-3 also have an excellent wear resistance. The wear resistance of the high speed tool steel product can be further improved by increasing an amount of carbides in the structure.

An object of the invention is to provide a method for producing a high-speed tool steel material capable of increasing carbides in a structure of a high speed tool steel product, and to provide a method for producing the high-speed tool steel product and to provide the high speed tool steel product.

According to the invention, provided is a method for producing a high-speed tool steel material, including, by mass %, C: 0.50% to 2.20%, Si: 0.10% to 1.00%, Mn: 0.10% to 1.00%, P: not more than 0.025%, S: not more than 0.0040%, Cr: 3.00% to 7.00%, Mo and W alone or in combination in an amount of (W+2Mo): 5.00 to 30.00%, V: 0.60 to 5.00%, and the balance of Fe and impurities. The method includes:

a casting step of casting a steel ingot from a molten steel, a blooming step of heat the ingot produced in the casting step at a temperature higher than 1120° C. and then hot-working it to produce an intermediate material, and a finishing step of heating the intermediate material produced in the blooming step at a temperature of 900° C. to 1120° C. and then hot-working it to produce the high-speed tool steel material having the above composition.

In an embodiment of the method, the high speed tool steel material further includes one or more of, by mass %, Co: not more than 10.00%, Al: not more than 0.30%, and Ca: not more than 0.0150%.

In an embodiment, the method further includes an annealing step of annealing the high speed tool steel material having the above composition produced in the finishing step.

According to the invention, also provided is a method for producing a high speed tool steel product including quenching and tempering the high speed tool steel material produced by the above method for producing the high speed tool steel material.

Also, the invention provides a high speed tool steel product including, by mass %, C: 0.50% to 2.20%, Si: 0.10% to 1.00%, Mn: 0.10% to 1.00%, P: not more than 0.025%, S: not more than 0.0040%, Cr: 3.00% to 7.00%, Mo and W alone or in combination in an amount of (W+2Mo): 5.00% to 30.00%, V: 0.60 to 5.00%, and the balance of Fe and impurities. In a cross sectional structure of the high speed tool steel product, an area ratio of MC carbides having a maximum length being not shorter than 0.40 μm in the cross sectional structure is not less than 3.8%, and an area ratio of $M_6C$ carbides having a maximum length being not shorter than 0.40 μm is not less than 6.8%.

In an embodiment, the high speed tool steel product further includes one or more of, by mass %, Co: not more than 10.00%, Al: not more than 0.30%, and Ca: not more than 0.0150%.

According to the invention, carbides can be increased in a structure of the high speed tool steel product.

Figure 1:
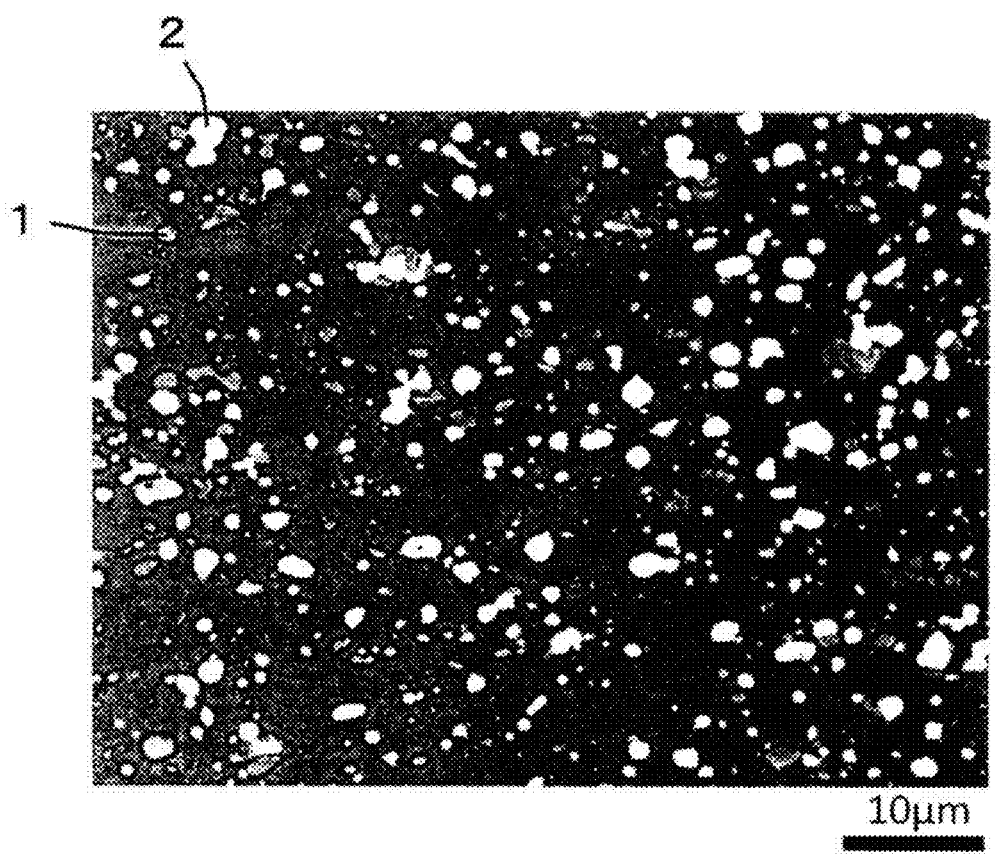
FIG. 1 shows a Back Scattered Electron (BSE) image of a cross-sectional structure of an example of a high speed tool steel product according to the invention.

DESCRIPTION OF EMBODIMENTS (1) A method according to the invention is for producing a high-speed tool steel material including, by mass %, C: 0.50% to 2.20%, Si: 0.10% to 1.00%, Mn: 0.10% to 1.00%, P: not more than 0.025%, S: not more than 0.0040%, Cr: 3.00% to 7.00%, Mo and W alone or in combination in an amount of (W+2Mo): 5.00 to 30.00%, V: 0.60 to 5.00%, and the balance of Fe and impurities. The high speed tool steel material may further include one or more of, by mass %, Co: not more than 10.00%, Al: not more than 0.30%, and Ca: not more than 0.0150%.

The composition of the high speed tool steel material (or of the product) according to the invention encompasses that of a conventional high speed tool steel material. The composition also encompasses general-purpose steel grade such as SKH51 which is standardized in JIS-G-4403 "High Speed Tool Steel Material". The composition will be explained below.

C: 0.50 to 2.20%

C (carbon) bonds to Cr, W, Mo or V to form a carbide and thus improves wear resistance of a product. However, too much carbon reduces toughness. Thus, an amount of carbon is made 0.50 to 2.20% provided that the carbon content is balanced with the Cr, W, Mo or V content which is explained below. Preferably, the carbon content is not less than 1.00%, more preferably not less than 1.10%. Also, the carbon content is preferably not more than 1.50%, more preferably not more than 1.30%, further more preferably not more than 1.25%.

Si: 0.10 to 1.00%

Si (silicon) is typically used as deoxidizer in a melting step. Si has an effect for increasing machinability of a material. However, too much Si reduces toughness of a product. Thus, an amount of Si is made 0.10 to 1.00%. Preferably, the Si content is not less than 0.25%, more preferably not less than 0.40%. Also, the Si content is preferably not more than 0.80%, more preferably not more than 0.60%.

Mn: 0.10 to 1.00%

Mn (manganese) is used as deoxidizer similar to Si. Mn has an effect of improving hardenability, and thus makes a product have an appropriate quenched and tempered hardness. However, too much Mn reduces toughness since residual austenite increases in a structure after quenching and tempering. Thus, an amount of Mn is 0.10 to 1.00%, preferably, not less than 0.15%, more preferably not less than 0.20%. Also, the Mn content is preferably not more than 0.75%, more preferably not more than 0.50%, further more preferably not more than 0.45%.

P: not more than 0.025%

(phosphorus) is inevitably included in various types of high speed tool steel materials even if it is not intentionally added. Phosphorus segregates in prior austenite grain boundaries and make the grain boundaries brittle during heat treatment, such as tempering. Therefore, phosphorus is limited to not more than 0.025% to maintain a toughness of a product, including the case of intentional addition.

S: Not More than 0.0040%

S (sulfur) is inevitably included in various types of high speed tool steel materials even if it is not intentionally added. If too much sulfur is included, it reduces hot workability of an ingot before hot-worked and an intermediate material, and thus cracks will be generated in the ingot and the intermediate material during the hot working. For a steel material including calcium described below, sulfur bonds to calcium to prevent improvement of the hot workability that is an advantageous function of calcium. Therefore, a sulfur content should be reduced and it should be limited to not more than 0.040%, preferably not more than 0.0020%, and more preferably not more than 0.0010%.

Cr: 3.00 to 7.00%

Cr is effective for increasing hardenability and increasing wear resistance of a product by forming a carbide. Cr also provides oxidation resistance. However, if two much Cr is included, it will lead to reduction of toughness and high temperature strength. Thus, a Cr content is made 3.00-7.00%. Preferably, the Cr content is not less than 3.50%, and more preferably not less than 4.00%. In addition, the Cr content is not more than 5.50%, and more preferably not more than 5.00%.

Mo and W Alone or in Combination in an Amount of (W+2Mo): 5.00-30.00%

W (tungsten) and Mo (molybdenum) are elements that bond to carbon to form a carbide to improve wear resistance and seizure resistance of a product. Also, W and Mo have a greater secondary hardening effect during tempering and thus can provide high temperature strength. W and Mo can include either alone or in combination. An amount of W and Mo can be defined by tungsten equivalent that is expressed as (W+2Mo), since Mo has an atomic weight of about half of W. In order to bring about the above effect, the value of the relational expression (W+2Mo) is made not less than 5.00%. Preferably, the value is not less than 10.00%, more preferably not less than 15.00%, further more preferably not less than 17.00%.

However, too much W and Mo is included, hot workability of a steel ingot and an intermediate material is reduced. Thus, the value of the relational expression (W+2Mo) is not more than 30.00%, more preferably not less than 22.00%, and further more preferably not less than 20.00%.

V: 0.60 to 5.00%

V (vanadium) is an element that bonds to carbon to form a hard carbide, and thus contributes to improve wear resistance of a product. However, when too much vanadium is included, a product has lower toughness. Thus, a vanadium content is made 0.60% to 5.00%. Preferably, the vanadium content is not less than 1.00%, more preferably not less than 1.50%, and further more preferably not less than 2.00%. Particularly preferable content is not less than 2.50%. Also, the vanadium content is preferably not more than 4.00%, more preferably not more than 3.50%, and further preferably not more than 3.00%.

In the high speed tool steel material according to the invention, Co, Al and Ca are elements that possibly remain in a steel. They may be included as needed in view of following effects.

Co: Not More than 10.00%

Co (cobalt) solid-solves into a matrix to improve toughness and heat resistance of a product. However, too much Co reduces toughness of a product. Thus, not more than 10.00% (including 0%) of Co may be included. The Co content is preferably not more than 5.00%, more preferably not more than 3.00%, and further more preferably not more than 2.00%. Even if Co is not intentionally added, Co may be included by e.g. less than 0.10%. In the case of addition of Co, the Co content is preferably not less than 1.00%.

Al: Not More than 0.30%

Al (aluminum) has an effect of making a cast structure uniform and fine, and improving hot workability of an ingot. However, if too much Al is included, much alumina-based inclusions are formed in a structure, and toughness of a product is reduces. Thus, not more than 0.30% of Al may be included. The Al content is preferably not more than 0.25%, more preferably not more than 0.20%. In the case of addition of Al, the Al content is preferably not less than 0.02%, more preferably not less than 0.06%, further more preferably not less than 0.08%, and particularly preferably not less than 0.10%.

Ca: Not More than 0.0150%

Ca (calcium) has an effect of increasing an absolute amount of MC carbides described below, and thus is effective to improve wear resistance of a product. Ca, similar to Al, makes a cast structure uniform and fine to improve hot workability of a steel ingot. However, if too much Ca is included, most of Ca form oxide-based inclusions to reduce cleanliness. Thus, not more than 0.0150% of Ca may be included. Not more than 0.0130% of Ca is preferable, more preferably not more than 0.0120%, and further more preferably not more than 0.0100%. In a case of addition of Ca, the Ca content is preferably not less than 0.0050%, more preferably not less than 0.0060%, and further more preferably not less than 0.0070%.

In the high speed tool steel material according to the invention, O (oxygen) and N (nitrogen) are elements that are possibly remain in the steel as impurities. These elements are preferable included as low as possible.

N: Not More than 0.0100%

N (nitrogen) is an element that inevitably exists in a steel. If too much nitrogen is included, much nitride-based inclusions are formed in a structure to lower quality of a product. Thus, the nitrogen content is preferably limited to not more than 0.0100%, more preferably not more than 0.0060%, further more preferably not more than 0.0050%, and particularly preferably not more than 0.0020%.

O: Not More than 0.0040%

O (oxygen) is an element that inevitably exists in a steel. If too much oxygen is included, much oxide-based inclusions are formed in a structure to lower quality of a product. Thus, the oxygen content is preferably limited to not more than 0.0040%, more preferably not more than 0.0030%, and further more preferably not more than 0.0020%.

(2) The method for producing a high-speed tool steel material according to the invention includes a casting step of casting a steel ingot from a molten steel.

As stated above, a high speed tool steel material is typically produced from an ingot as a starting material that have been produced by casting a molten steel having adjusted to have a predetermined composition. According to the invention, any processes of producing the ingot may be employed other than an typical ingot making process with use of an ingot case, such as continuous casting process, or vacuum arc remelting or electro-slag remelting process that is conducted for an once cast ingot. In this connection, e.g. JIS-G-0203 titled "Terminology for Steel Industry (product and quality)" defines the "ingot" as "solidified steel that had been cast of a molten steel into a casting mold (an ingot case) and solidified therein, or a continuous-cast steep piece. Typically, the ingot is worked into a semi-finished product or a product through a post process such as hot working or forging. (An ingot includes one that was remelted through vacuum arc or electro-slag process and cast)."

The ingot may be subjected to, if necessary, e.g. soaking treatment (soaking process) in which the ingot is held at a predetermined temperature for a predetermined time period.

(3) The method for producing a high-speed tool steel material according to invention includes a blooming step of heat the ingot produced in the casting step described in (2) at a temperature higher than 1120° C. and then hot-working it to produce an intermediate material A composition of the high speed tool steel material according to the invention includes, as stated above, that of general purpose steel grade of SKH51 etc. A characteristic of the invention is to adjust conditions of the hot working, for a producing method of a high-speed tool steel including such general purpose steel grade, so that carbides in a structure of a high speed tool steel product can be increased to increase wear resistance without changing the composition.

It is effective to increase an amount of carbides in a quenched and tempered structure of the high speed tool steel product in order to improve wear resistance thereof. Among the carbides, "MC carbides" including more vanadium and "$M_6C$ carbides" including more tungsten and molybdenum are hard and suitable for improving the wear resistance. Thus, it is effective for improving the wear resistance of the high speed tool steel product to increase particularly MC and $M_6C$ carbides in the structure of the product. The inventors found that, even for a conventional high speed tool steel product, the carbides can be increased by employing special conditions of the hot working without modifying a composition thereof.

In a typical method for producing the high speed tool steel material, the hot working process includes "blooming step" for blooming a steel ingot produced by a casting step as described in (2) and "finishing step" for working an intermediate material produced by the blooming step to finish it into a steel product. Here, the "intermediate material" may be interpreted as a state of "semi-finished product" defined in e.g. JIS-G-0203 "Terminology for Steel Industry (product and quality)". The "semi-finished product" is defined in JIS-G-0203 as "a semi-finished product having a constant cross-sectional shape along a longitudinal direction, that is produced by rolling or forging an ingot or by continuous casting. Typically, the semi-finished product is intended to be hot-worked or hot-forged in the subsequent step to work it into a finished product. It is classified in a slab, a bloom, a sheet bar and the like according to a shape and a dimension of its cross section".

In a conventional hot working, the hot working temperature has been controlled to be in a same temperature range from the blooming step to the finishing step. Furthermore, higher hot working temperature has been selected, such as 1160° C. in Patent Literature 1, and 1150° C. in Patent Literature 3.

In a method for producing a high speed tool steel material according to the invention, a working temperature during the "blooming step" and a working temperature during the "finishing step" in the hot working are controlled separately.

First, the working temperature of the blooming step is explained. The blooming step has a role in breaking eutectic type coarse MC carbides existing in a cast structure of an ingot. The blooming step also has a role in decomposing eutectic type $M_2C$ carbides in the casting structure of the ingot and transforming it into $M_6C$ carbides. Thus, it is effective to increase the working temperature at a high temperature such that the breakage of MC carbides and decomposition of $M_2C$ carbides are facilitated during the blooming step in order to increase the MC and $M_6C$ carbides in the structure. According to the invention, the working temperature in the blooming step is determined to be higher than 1120° C. (i. e., a temperature of the ingot) and thus the steel ingot before bloomed should be heated higher than 1120° C. Preferably, the temperature is not lower than 1130° C. While there is particularly no need to set an upper limit of the temperature, the heating temperature is efficient to be not higher than 1160° C. in view of heating cost. Preferably, the temperature is not higher than 1150° C., and more preferably not higher than 1140° C.

The high working temperature in the blooming step is also preferable to maintain plastic workability of the ingot at a high level. Typically, the ingot has a larger cross-sectional area than the intermediate material (or the semi-finished product). Thus, the ingot is required to have better plastic workability during the blooming step than the intermediate material during the finishing step described later. If the working temperature is too low in the blooming step, the steel ingot may be subjected to cracking.

Typically, the temperature of the ingot gradually falls during the blooming step from the start of the blooming. Thus, the temperature of the ingot (i.e., the intermediate material) might be not higher than 1120° C. at the end of the blooming. Even if this is the case, the effect of the blooming according to the invention may be obtained as far as the start temperature of blooming is higher than 1120° C. Preferably, the temperature at the end of the blooming is higher than 900° C. Further preferably, the temperature during the blooming is kept to be higher than 1120° C. from the start to the end of the blooming. Thereby, the plastic workability of the ingot can be maintained, and the ingot is easily worked into the intermediate material having a predetermined dimension. Also, a great working ratio can be applied to the ingot.

In order to keep the blooming temperature of the ingot at a temperature of not lower than 900° C. (or, higher than 1120° C.), the blooming may be stopped when the temperature decreases close to 900° C. to reheat the ingot, for example by reheating the ingot in a furnace. Then, the blooming may be repeated until the reheated ingot is worked in an intermediate material having a predetermined dimension (or until a predetermined working ratio is applied to the ingot).

(4) The method for producing a high-speed tool steel material according to the invention includes a finishing step of heating the intermediate material produced in the blooming step (3) at a temperature of 900° C. to 1120° C. and hot-working it to produce the high-speed tool steel material having the above composition.

The finishing step is a step for hot-working the intermediate material produced in the blooming step, and the intermediate material is finished in a steel product. This finishing step finishes the intermediate material into a high speed tool steel material having a predetermined shape and dimension in accordance with a product shape. In this connection, the "steel product" is defined in e.g. JIS-G-0203 "Terminology for Steel Industry (product and quality)" as "a general term of a steel that is processed into a required shape through various processes such as rolling, forging, drawing or casting, although an ingot and a semi-finished product is not included." The high speed tool steel material according to the invention is of a shape of, for example, a bar having a cross section defining a diameter or a side being about 5-50 mm in a case where the product is an end mill, a drill, a tap etc. In a case where the product is a band saw or the like, the high speed tool steel material is of a shape of a wire having a cross section defining a diameter or a side being about 1-5 mm.

The finishing step is also a step of spheroidizing the MC and $M_6C$ carbides in the structure produced during the blooming step. It is an important step for the invention, since it contributes to increase the MC and $M_6C$ carbides.

If the temperature (i.e. a temperature of the intermediate material) during the finishing step for working the intermediate material produced in the blooming step (3) may be higher than 1120° C. same as in blooming step, the MC and $M_6C$ carbides in the structure of the intermediate material solid-solve in a matrix of an austenite structure in the heating before and during the finishing work, and thus the MC and $M_6C$ carbides decrease. As a result, an amount of MC and $M_6C$ carbides differs even though it has the same composition, and the amount of MC and $M_6C$ carbides decreases thereby wear resistance of the product is decreased. Thus, the invention limits the working temperature in the finishing step to not higher than 1120° C., and therefore the heating temperature of the intermediate material before the finishing step is limited to not more than 1120° C. Preferably, the temperature is not higher than 1115° C., more preferably not higher than 1110° C.

A temperature of the intermediate material during the finishing work gradually decreases after start of the finishing step, as is the case of the blooming working. If the temperature of the intermediate material may be too low during the finishing work, workability of the intermediate material decreases and it becomes difficult to produce a steel material having a predetermined dimension. Therefore, the intermediate material is heated at a temperature of not lower than 900° C. prior to the finishing step. The working temperature is preferably kept between 1120° C. and 900° C. from the start to the end of the finishing step. It is also preferable to keep the working temperature at 900° C. to 1050° C. at the end of the finishing step. Thereby, the workability of the intermediate material can be maintained and the steel product having a predetermined dimension can be easily produced. In order to keep the temperature of the intermediate material at a temperature of not lower than 900° C. during the finishing step, the finishing work may be stopped when the temperature decreases close to 900° C. to reheat the intermediate material, for example by reheating it in a furnace. Then, the working may be repeated until the reheated intermediate material is worked in a steel material having a predetermined dimension.

(5) Preferably, the method for producing a high-speed tool steel material according to the invention may further include an annealing step of annealing the steel material produced in the finishing step (4).

It is a normal process to anneal the steel material produced in the finishing step. This annealing may provide machinability for machining it into a product shape. Also, residual stress after the hot working may be removed from the steel material. An annealing temperature is typically up to about 870° C. When the annealing temperature is too high, solid-solution of the MC and $M_6C$ carbides into a matrix of the structure of the steel material is facilitated. Thus, the annealing temperature is preferable not higher than 900° C. Also, the annealing temperature is preferable not lower than 860° C.

(6) A method for producing a high speed tool steel product includes quenching and tempering the high speed tool steel material produced by the above method including each step explained above.

The high speed tool steel material produced by the above method is quenched and tempered to harden it to a predetermined hardness and adjust it to a high speed tool steel product. The high speed tool steel material is also adjust to have a shape of the high speed tool steel product through various types of machining steps such as cutting and drilling. The machining is preferable conducted in a low hardness condition (in an annealed condition) before quenched and tempered. In the case, finishing machining may be further conducted after quenched and tempered.

While temperatures for quenching and tempering change according to compositions of the high speed tool steel material and target hardness etc., preferable quenching temperature is about 1170° C. to about 1220° C., and preferable tempering temperature is about 550° C. to about 590° C. In a case of a high speed tool steel SKH51 for example, the quenching temperature is about 1180 to about 1210° C. and the tempering temperature is about 550° C. to about 580° C. The quenched and tempered hardness is preferable not more than 69HRC. It is preferably not less than 64HRC.

Among MC and $M_6C$ carbides, those having a maximum length of not shorter than 0.40 μm in a cross-sectional structure of the high speed tool steel products have a large effect of improving wear resistance. In a conventional high speed tool steel product, the area ratios of the MC and $M_6C$ carbides having the maximum length of not shorter than 0.40 μm have been up to about 3.0% and 6.0%, respectively.

According to the method of the invention, the area ratio of the MC carbides having the maximum length of not shorter than 0.40 μm can be increased to not less than 3.8%. Preferably, the area ratio can be increased to not less than 4.0%. The upper limit of the area ratio of the MC carbides is not particularly determined. However, not more than 9.0% is realistic.

Also, according to the method of the invention, the area ratio of the $M_6C$ carbides having the maximum length of not shorter than 0.40 μm can be increased to not less than 6.8%. Preferably, the area ratio can be increased to not less than 7.0%. The upper limit of the area ratio of the $M_6C$ carbides is not particularly determined. However, not more than 12.0% is realistic.

A measuring of the area ratio of the MC and $M_6C$ carbides having the maximum length of not shorter than 0.40 μm in the cross-sectional structure of the high speed tool steel product is explained below.

First, a sample to be observed of its cross-section is taken from the steel product. The portion to be observed may be a working site of the product (when the product is a cutting tool or a cutoff tool, the portion is a cutting edge, and when the product is a mold, the portion is a engraving side.).

Next, the cross-section is mirror-polished. The polished structure is observed with a scanning electron microscope at 2000 magnifications, and Back Scattered Electron (BSE) image of 1260*960 pixels (63 μm×48 μm area) per one field of view is stored. The images of 10 fields of view are prepared. The BSE image can distinguish compositional differences of C, W, Mo, V and Fe etc. Thus, it can represent MC carbides and $M_6C$ carbides by light and shade of contrast. FIG. 1 shows an example of the BSE image of the cross-sectional structure of a high speed tool steel product A1 later described in Example. In FIG. 1, particles dispersed in a matrix are carbides. Among the carbides, dark-colored particles are "MC carbides (reference numeral 1)" and light-colored ones are "$M_6C$ carbides ((reference numeral 2)".

From these BSE images, MC carbides and $M_6C$ carbides having the maximum length of not shorter than 0.40 μm are extracted with use of image analysis software, and the respective area ratios of these carbides in the total cross-sectional structure of 10 fields of view are obtained.

EXAMPLE 1

A molten steel having been adjusted to have a predetermined composition was prepared, and was cast into a steel ingot of a high speed tool steel. The composition of the ingot is shown in Table 1.

TABLE 1

| Composition (mass %) | | | | | | | | | | | | | | |
|---|---|---|---|---|---|---|---|---|---|---|---|---|---|---|
| C | Si | Mn | P | S | Cr | W | Mo | V | Co | Al | Ca | N | O | Fe※ |
| 1.18 | 0.49 | 0.29 | 0.021 | 0.0002 | 4.23 | 5.20 | 6.39 | 2.74 | 0.23 | 0.14 | 0.0087 | 0.0047 | 0.0004 | Balance |

※including impurities

Then the ingot was bloomed. The ingot was heated at 1130° C. and hot-worked to produce an intermediate material (a semi-finished product) having a sectional dimension of 135 mm*135 mm. Here, the working temperature was defined as a temperature measured on a surface of the ingot. The ingot was not reheated during the hot working. At the end of the hot working, the temperature was 1049° C.

Next, the intermediate material produced in the blooming step was finish-worked. The intermediate material was heated at each temperature shown in Table 2 and hot-worked to produce a bar having a diameter of 11 mm. Thus, high speed tool steel materials A1-A6 and B1-B4 were produced. Here, the working temperature was defined as a temperature measured on a surface of the intermediate material. The intermediate material was not reheated during the hot working. At the end of the hot working, the temperature was in a range of 1000° C. to 1040° C.

The high speed tool steel materials were annealed at 870° C. Then, the materials were heated and held at 1190° C. for 30 minutes, and quenched. The quenched materials were tempered twice each at 560° C. for one hour (a target hardness is 65.5HRC). Thus, high speed tool steel products A1-A6 and B1-B4 were produced.

For each product, area ratios of the MC carbides and M6C carbides having a maximum length of not shorter than 0.40 μm in the cross-sectional structure were measured with the above described measuring method. The cross-section to be observed was taken from a longitudinal section including a central line of the bar. Furthermore, observed portion in the longitudinal section was a position at a distance of ⅛ of a diameter of the bar from a surface toward the center of the product. As the Image analysis software, "SCANDIUM" from Olympus Corporation was used. The results are shown in Table 2. The BSE image of the cross-sectional structure of the high speed tool steel product A1 is shown in FIG. 1

TABLE 2

| Product | Heating temperature in blooming step (° C.) | Heating temperature in finishing step (° C.) | Area ratio of MC carbides (%) | Area ratio of $M_6C$ carbides (%) | Remarks |
| --- | --- | --- | --- | --- | --- |
| A1 | 1130 | 1102 | 4.0 | 7.0 | Example according to the invention |
| A2 | | 1103 | 4.4 | 7.5 | |
| A3 | | 1107 | 4.0 | 7.3 | |
| A4 | | 1108 | 4.0 | 6.9 | |
| A5 | | 1109 | 4.5 | 7.0 | |
| A6 | | 1111 | 4.2 | 7.1 | |
| B1 | | 1128 | 4.0 | 6.6 | Comparative example |
| B2 | | 1129 | 3.8 | 6.2 | |
| B3 | | 1130 | 3.7 | 6.5 | |
| B4 | | 1140 | 3.4 | 6.5 | |

The examples A1 to A6 according to the invention were subjected to the blooming process after heated at a temperature higher than 1120° C., and to the finishing process where they were hot-worked at a temperature at which MC and $M_6C$ carbides hardly solid-solve in a matrix. Therefore, the area ratio of the MC carbides having the maximum length of not shorter than 0.40 μm in the cross-sectional structure was not less than 3.8%, and that of $M_6C$ carbide was not less than 6.8%.

However, the comparative examples B1 to B4 were subjected to the blooming process after heated at a temperature higher than 1120° C., and to the finishing process where they were hot-worked at a temperature at which MC and $M_6C$ carbides easily solid-solve in the matrix. Therefore, the area ratios of the MC and $M_6C$ carbides having the maximum length of not shorter than 0.40 μm were less than those of the examples A1 to A6.

Figure 2:
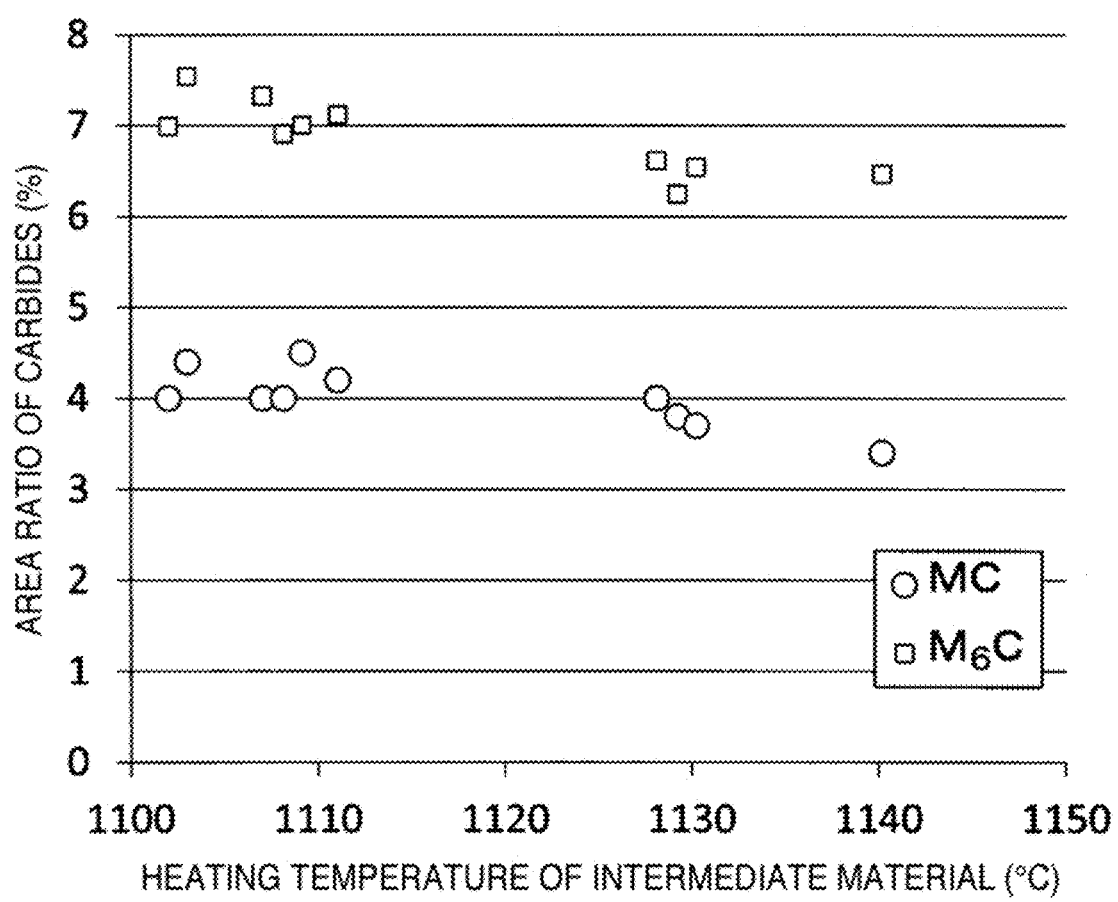
FIG. 2 shows relationship between a heating temperature of an intermediate material in a finishing step, and an area ratio of MC and $M_6C$ carbides in a cross-sectional structure of a product.

FIG. 2 shows a relationship between the heating temperature of the intermediate material (i.e., a starting temperature of the process) in the finishing work, and the area ratio of MC carbides and $M_6C$ carbides having the maximum length of not shorter than 0.40 μm in the cross-sectional structure of the high speed tool steel product, with use of the results of Table 2. It is understood from FIG. 2 that the MC and $M_6C$ carbides in the cross-sectional structure is increased by lowering the working temperature in the finishing step.

EXAMPLE 2

Molten steels having been adjusted to have predetermined compositions were prepared, and were cast into steel ingots of high speed tool steels. The compositions of the ingots are shown in Table 3.

The ingots 1 and 2 were heated at 1140° C. and bloomed to produce intermediate materials (semi-finished products) having a sectional dimension of 80 mm*80 mm. The ingots were not reheated during the hot working of the blooming step. At the end of the hot working, the temperature (a surface temperature of the ingots) was 1080° C.

Although the blooming step was also conducted at a lower heating temperature of 1080° C. (i.e. a staring temperature of the blooming step) for the ingots 1 and 2, tips of the ingots cracked in the blooming step and blooming step could not be progressed. Since intermediate materials in a good state were not produced, subsequent experiments were stopped.

Next, the intermediate materials produced in the blooming step at a heating temperature of 1140° C. were heated at temperatures shown in Table 4, and were finish-worked by cogging process. Then, high speed tool steel materials 1 and 2, corresponding to the ingots 1 and 2 respectively, were produced, which have a rectangular bar shape having a cross-section of 20 mm*20 mm. Here, the intermediate materials were not reheated during the finishing step. At the end of the finishing step, the temperature (a surface temperature of the intermediate materials) was 1010° C.

The high speed tool steel materials 1 and 2 were annealed at 870° C. Then, the materials 1 and 2 were heated and held at 1190° C. for 30 minutes and then quenched. The quenched materials 1 and 2 were tempered twice, each at 560° C. for one hour (a target hardness is 65.5HRC). Thus, high speed tool steel products 1 and 2 were produced, which correspond to the high speed tool steel materials 1 and 2 respectively.

The area ratios of the MC carbides and M6C carbides having a maximum length of not shorter than 0.40 μm in the cross-sectional structure of the products 1 and 2 were measured with the above described measuring method. The observed cross-section was taken from a longitudinal section including a central line of the bar. Furthermore, observed portion in the longitudinal section was a position at a distance of ⅛ of a side length of the bar from a surface toward the center of the product. The results are shown in Table 4.

In addition, the products 1 and 2 were subjected to Ogoshi-type abrasion test where the surface positioned at a distance of ⅛ of a side length of the bar from a surface was used as a test surface. Test conditions were as follows.
  counterpart material: a normalized SCM415 (hardness: 183HBW)
  applied load: 64.7N (6.6 kgf)
  sliding distance: 400 m
  sliding speed: 0.97 m/s
The tests under the conditions were conducted three times for each product, and a specific wear rate was measured. The specific wear rates were averaged. As the specific wear rate is smaller, higher is the wear resistance. The results are shown in Table 4.

TABLE 3

| Steel ingot | Composition (mass %) | | | | | | | | | | | | | | |
| --- | --- | --- | --- | --- | --- | --- | --- | --- | --- | --- | --- | --- | --- | --- | --- |
| | C | Si | Mn | P | S | Cr | W | Mo | V | Co | Al | Ca | N | O | Fe* |
| 1 | 1.17 | 0.51 | 0.31 | 0.017 | 0.0026 | 4.20 | 5.28 | 6.42 | 2.48 | 0.09 | 0.15 | 0.0091 | 0.0820 | 0.0013 | Balance |
| 2 | 1.17 | 0.50 | 0.31 | 0.020 | 0.0018 | 4.13 | 5.31 | 6.45 | 2.84 | 0.05 | 0.13 | 0.0081 | 0.0022 | 0.0018 | Balance |

*including impurities

TABLE 4

| Product | Heating temperature (° C.) Blooming | Heating temperature (° C.) Finishing | Area ratio of carbides (%) MC carbides | Area ratio of carbides (%) $M_6C$ carbides | Specific wear rate ($\times 10^{-7}$) ($mm^3/kg$) | Remarks |
|---|---|---|---|---|---|---|
| 1 | 1140 | 1080 | 3.9 | 9.1 | 0.370 | Example according to the invention |
| 2 | | 1140 | 3.7 | 8.7 | 0.425 | Comparative example |

For the high speed tool steel product 1 according to the invention, the area ratio of MC carbides having maximum length of not shorter than 0.40 μm in the cross-sectional structure was not less than 3.8% and that of $M_6C$ carbides was not less than 6.8%. Furthermore, the area ratio of $M_6C$ carbides increased to 9.0% or more. The reason is supposed since eutectic type of $M_2C$ carbide in the cast structure of the ingot was facilitated to decompose due to higher heating temperature of the ingot in the blooming step.

On the other hand, the area ratios of the MC carbides and M6C carbides of the product 2 were lower than those of the product 1. Although the ingot 2 was heated at a high heating temperature in the blooming step, the heating temperature of the intermediate material in subsequent finishing step was high and thus MC and $M_6C$ carbides in the structure of intermediate material will have been solved in a matrix.

The specific wear rate of the product 1 was smaller than that of the product 2. It shows that the wear resistance of the high speed tool steel product 1 is higher than that of the product 2

REFERENCE SIGNS LIST

1 MC carbides
2 $M_6C$ carbides

The invention claimed is:

1. A method for producing a high speed tool steel material comprising, by mass %, C: 0.50% to 2.20%, Si: 0.10% to 1.00%, Mn: 0.10% A to 1.00%, P: not more than 0.025%, S: not more than 0.040%, Cr: 3.00% to 7.00%, Mo and W alone or in combination in an amount of (W+2Mo): 5.00% to 30.00%, V: 0.60% to 5.00%, and the balance of Fe and impurities, the method comprising;

a casting step of casting a steel ingot from a molten steel;
a blooming step of heat the ingot produced in the casting step at a blooming starting temperature of higher than 1120° C. and then blooming it to produce an intermediate material; and
a finishing step of heating the intermediate material produced in the blooming step at a finish-work starting temperature of 900° C. to 1115° C. and then finish-working it to produce the high-speed tool steel material having the composition.

2. The method according to claim 1, wherein the high speed tool steel material further comprises one or more of, by mass %, Co: not more than 10.00%, Al: not more than 0.30%, and Ca: not more than 0.0150%.

3. The method according to claim 2, further comprising an annealing step of annealing the high speed tool steel material having the composition produced in the finishing step.

4. The method according to claim 1, further comprising an annealing step of annealing the high speed tool steel material having the composition produced in the finishing step.

5. A method for producing a high speed tool steel product, comprising
quenching and tempering the high speed tool steel material produced by the method according to claim 1.

6. The method according to claim 5, wherein the high speed tool steel material further comprises one or more of, by mass %, Co: not more than 10.00%, Al: not more than 0.30%, and Ca: not more than 0.0150%.

7. The method according to claim 6, further comprising an annealing step of annealing the high speed tool steel material having the composition produced in the finishing step, before the quenching and tempering step.

8. The method according to claim 5, further comprising an annealing step of annealing the high speed tool steel material having the composition produced in the finishing step, before the quenching and tempering step.

* * * * *